(12) United States Patent
Suzuki et al.

(10) Patent No.: US 6,444,769 B2
(45) Date of Patent: Sep. 3, 2002

(54) PRODUCTION PROCESS FOR ETHYLENIMINE POLYMER AQUEOUS SOLUTION

(75) Inventors: Seiichi Suzuki, Yokohama; Yoshiyuki Onda, Tokyo; Isao Satoh, Yokohama, all of (JP)

(73) Assignee: Nippon Shokubai Co. Ltd., Osaka (JP)

( * ) Notice: Subject to any disclaimer, the term of this patent is extended or adjusted under 35 U.S.C. 154(b) by 0 days.

(21) Appl. No.: 09/810,568

(22) Filed: Mar. 19, 2001

(30) Foreign Application Priority Data

Apr. 10, 2000 (JP) .......................................... 2000-107452

(51) Int. Cl.[7] .............................................. C08F 126/08
(52) U.S. Cl. ........................................ 526/263; 526/258
(58) Field of Search .................................. 526/258, 263

(56) References Cited

FOREIGN PATENT DOCUMENTS

JP          88281968          8/1993

*Primary Examiner*—Helen L. Pezzuto
(74) *Attorney, Agent, or Firm*—Sherman & Shalloway

(57) ABSTRACT

Provided is a process for producing an ethylenimine polymer aqueous solution which has a high concentration (high resin content) and is less changeable with the passage of time, that is, has a stabilized quality. The above process comprises polymerizing ethylenimine in a water based medium at a temperature of 80° C. or lower and then ripening it at a temperature of 100 to 150° C.

3 Claims, No Drawings

PRODUCTION PROCESS FOR ETHYLENIMINE POLYMER AQUEOUS SOLUTION

FIELD OF INDUSTRIAL APPLICATION

The present invention relates to a production process for an ethylenimine polymer aqueous solution.

RELATED ART

An ethylenimine polymer is obtained by polymerizing ethylenimine in the presence of a polymerization initiator, and the resulting ethylenimine polymer has a low polymerization degree in polymerization in the absence of a solvent because of a problem on a viscosity. Accordingly, polymerization reaction is carried out in a water based medium in order to obtain an ethylenimine polymer having a high polymerization degree to obtain the ethylenimine polymer having a high molecular weight in the form of an aqueous solution thereof. Described in, for example, Japanese Patent Publication No. 8828/1968 is a process in which ethylenimine is polymerized in a water based solution at a temperature falling in a range of 50° C. to a boiling point of the ethylenimine aqueous solution in the presence of a polyhaloalkane polymerization initiator to thereby obtain an ethylenimine polymer aqueous solution.

PROBLEMS TO BE SOLVED BY THE INVENTION

However, an ethylenimine polymer aqueous solution obtained by a conventional process has the problem that the viscosity is reduced with the passage of time, that is, the quality is not stabilized. Further, it has been difficult to produce an ethylenimine polymer aqueous solution having a high concentration (high resin content) by a conventional process.

Accordingly, an object of the present invention is to provide a production process for an ethylenimine polymer aqueous solution which has a high concentration and is less changeable with the passage of time, that is, has a stabilized quality.

MEANS FOR SOLVING THE PROBLEMS

The present inventors have found that the object described above can be achieved by polymerizing ethylenimine at a relatively low temperature and then ripening in a specific temperature range.

Thus, according to the present invention, provided is a process for polymerizing ethylenimine in a water based medium to produce an ethylenimine polymer aqueous solution, wherein ethylenimine is polymerized at a temperature of 80° C. or lower and then ripened at a temperature of 100 to 150° C.

EMBODIMENT OF THE INVENTION

Ethylenimine used as a raw material in the present invention shall not specifically be restricted. Capable of being used in the present invention is any of ethylenimines obtained by, for example, a process in which halogenated ethylamine is subjected to intermolecular cyclization with concentrated alkali, a process in which monoethanolamine sulfuric acid ester is subjected to intermolecular cyclization with hot concentrated alkali and a process in which monoethanolamine is subjected to catalytic vapor phase intermolecular dehydration reaction.

Compounds usually used for polymerization of ethylenimine can be used as the polymerization initiator, and suitably used are haloalkanes such as 1,2-dichloroethane, 1,3-dichloropropane, 1,2-dibromoethane and chloroform. A use amount of the polymerization initiator can suitably be selected depending on a molecular weight of the intended ethylenimine polymer. In order to obtain an aqueous solution of a high molecular weight ethylenimine polymer, it is suitably used in a proportion of 0.5 to 5% by weight based on ethylenimine.

Usually, water is used as the water based medium, but capable of being used as well are mixtures of water with water-soluble organic solvents such as methanol, ethanol, acetone and dimethylformamide.

In the present invention, ethylenimine is polymerized at a temperature of 80° C. or lower, preferably 50 to 70° C. The temperature exceeding 80° C. can not provide an ethylenimine polymer aqueous solution having a stable quality. On the other hand, the too low temperature elongates the polymerization time and therefore is not economical.

In the present invention, the reaction solution is heated to 100 to 150° C., preferably 110 to 140° C. after polymerization of ethylenimine is finished, preferably after 95% or more of ethylenimine fed is consumed, and then it is ripened in this temperature range. The temperature lower than 100° C. can not provide an ethylenimine polymer aqueous solution having a stable quality. On the other hand, the temperature higher than 150° C. causes thermal decomposition of the resulting ethylenimine polymer, so that the polymer having a high molecular weight is not obtained in a certain case. The ripening time is usually 2 to 20 hours, preferably 4 to 10 hours. Also, time consumed for heating the reaction solution up to the ripening temperature is usually 0.2 to 5 hours, preferably 0.5 to 3 hours.

In polymerization reaction of ethylenimine in the present invention, the polymerization initiator and ethylenimine may be added in one lot, but because of exothermic reaction, it is recommendable to continuously feed each of them while controlling the temperature.

The polymerization reaction can be carried out under either atmospheric pressure or applied pressure. Usually, a pressure of 0 to 10 MPaG, preferably 0 to 2 MPaG is employed. It is recommendable to ripen the reaction solution usually under applying a pressure of 0.05 to 10 MPaG, preferably 0.05 to 1 MPaG.

The polymerization reaction and the ripening treatment can be carried out by any reaction form of a batch system, a semi-batch system and a continuous flow system. When carried out by the batch system, the polymer has an elevated viscosity particularly in polymerization reaction, so that suitably used is a stirring blade for a high viscosity for removing heat, dispersing and accelerating reaction, for example, a Max Blend blade (manufactured by Sumitomo Juki Ind. Co., Ltd.). In this case, a vertical shell and tube type condenser is preferably used in order to effectively remove heat to polymerize ethylenimine under refluxing.

The ethylenimine polymer aqueous solution obtained according to the process of the present invention has a concentration (resin content) of usually 20 to 70% by weight. Also, the ethylenimine polymer has an average molecular weight of 1,000 to 1,000,000 (determined by gel permeation chromatography (GPC); pluran-reduced).

The ethylenimine polymer aqueous solution obtained according to the process of the present invention is widely used in the fields such as a paper processing agent, an adhesive, a coating material, an ink, a fiber treating agent, a flocculant, cosmetics, toiletries and a dispersant.

EFFECTS OF THE INVENTION

According to the process of the present invention, obtained is an ethylenimine polymer aqueous solution which is less changeable with the passage of time and has a stabilized quality and which contains the ethylenimine polymer in a high concentration of 20 to 70 mass %.

EXAMPLES

The present invention shall more specifically be explained below with reference to examples.

Example 1
Preparation of Ethylenimine Polymer Aqueous Solution:

A pressure tight reactor having a volume of 3 liters equipped with a stirrer, a thermometer and an ethylenimine and a polymerization initiator-feeding tube was charged with 1200 g of water and heated to 60° C., and then 800 g of ethylenimine and 13.2 g of 1,2-dichloroethane (1.65% by weight based on ethylenimine) were fed to the reactor in 8 hours while maintaining 60° C. Then, the solution was stirred at 60° C. for 4 hours to find that 98% of the raw material ethylenimine was reacted. The reaction solution in this stage had a viscosity of 500 mPa·s/25° C.

Subsequently, the reaction solution was heated up to 120° C. in 30 minutes and ripened at a temperature of 120° C. and a pressure of 0.1 MPaG for 5 hours. A viscosity of the reaction solution immediately after heated to 120° C. reached 5300 mPa·s/25° C. A change in the viscosity during ripening was not observed.

Evaluation of Ethylenimine Polymer Aqueous Solution:

The ethylenimine polymer aqueous solution obtained in the manner described above was maintained at 70° C. to investigate a change in the viscosity with the passage of time. The results thereof are shown in Table 1.

Example 2
Preparation of Ethylenimine Polymer Aqueous Solution:

A pressure tight reactor having a volume of 3 liters equipped with a stirrer, a thermometer and an ethylenimine and a polymerization initiator-feeding tube was charged with 1200 g of water and heated to 60° C., and then 800 g of ethylenimine and 12.7 g of 1,2-dichloroethane (1.59% by weight based on ethylenimine) were fed to the reactor in 8 hours while maintaining 60° C. Then, the solution was stirred at 60° C. for 4 hours to find that 98% of the raw material ethylenimine was reacted. The reaction solution in this stage had a viscosity of 450 mPa·s/25° C.

Subsequently, the reaction solution was heated up to 120° C. in 30 minutes and ripened at a temperature of 120° C. and a pressure of 0.1 MPaG for 5 hours. A viscosity of the reaction solution immediately after heated to 120° C. reached 4550 mPa·s/25° C. A change in the viscosity during ripening was not observed.

Evaluation of Ethylenimine Polymer Aqueous Solution:

The ethylenimine polymer aqueous solution obtained in the manner described above was maintained at 70° C. to investigate a change in the viscosity with the passage of time. The results thereof are shown in Table 1.

Example 3
Preparation of Ethylenimine Polymer Aqueous Solution:

A pressure tight reactor having a volume of 3 liters equipped with a stirrer, a thermometer and an ethylenimine and a polymerization initiator-feeding tube was charged with 1200 g of water and heated to 60° C., and then 800 g of ethylenimine and 11.8 g of 1,2-dichloroethane (1.48% by weight based on ethylenimine) were fed to the reactor in 8 hours while maintaining 60° C. Then, the solution was stirred at 60° C. for 4 hours to find that 98% of the raw material ethylenimine was reacted. The reaction solution in this stage had a viscosity of 400 mPa·s/25° C.

Subsequently, the reaction solution was heated up to 120° C. in 30 minutes and ripened at a temperature of 120° C. and a pressure of 0.1 MPaG for 5 hours. A viscosity of the reaction solution immediately after heated to 120° C. reached 3100 mPa·s/25° C. A change in the viscosity during ripening was not observed.

Evaluation of Ethylenimine Polymer Aqueous Solution:

The ethylenimine polymer aqueous solution obtained in the manner described above was maintained at 70° C. to investigate a change in the viscosity with the passage of time. The results thereof are shown in Table 1.

Comparative Example 1
Preparation of Ethylenimine Polymer Aqueous Solution:

A pressure tight reactor having a volume of 3 liters equipped with a stirrer, a thermometer and an ethylenimine and a polymerization initiator-feeding tube was charged with 1200 g of water and heated to 90° C., and then 800 g of ethylenimine and 17.6 g of 1,2-dichloroethane (2.20% by weight based on ethylenimine) were fed to the reactor in 3 hours while maintaining 90° C. The reaction solution had a viscosity of 3000 mPa·s/25° C. in finishing feeding.

Subsequently, the reaction solution was maintained at 90° C. to carry out ripening. A viscosity of the reaction solution reached 8500 mPa·s/25° C. after 1.5 hour, but thereafter it started lowering and was lowered down to 4000 mPa·s/25° C.

Evaluation of Ethylenimine Polymer Aqueous Solution:

The ethylenimine polymer aqueous solution obtained in the manner described above was maintained at 70° C. to investigate a change in the viscosity with the passage of time. The results thereof are shown in Table 1.

TABLE 1

| | Change in viscosity with passage of time (mPa · s/25° C.) | | | | |
|---|---|---|---|---|---|
| | Immediately after preparation | After 3 days | After 5 days | After 8 days | After 10 days |
| Example 1 | 5300 | 5200 | 5200 | 5200 | 5200 |
| Example 2 | 4550 | 4500 | 4500 | 4500 | 4500 |
| Example 3 | 3100 | 3000 | 3000 | 3000 | 3000 |
| Comparative Example 1 | 4000 | 2500 | 1500 | 1450 | 1400 |

What is claimed is:

1. A production process for an ethylenimine polymer aqueous solution by polymerizing ethylenimine in a water based medium, wherein ethylenimine is polymerized at a temperature of 80° C. or lower and then ripened at a temperature of 110° C. to 150° C.

2. The production process for an ethylenimine polymer aqueous solution as described in claim 1, wherein ethylenimine is polymerized at 50 to 70° C. and then ripened at 110 to 140° C.

3. An ethylenimine polymer aqueous solution produced by the process as described in claim 1.

* * * * *